(12) United States Patent
Hu et al.

(10) Patent No.: US 9,465,231 B2
(45) Date of Patent: Oct. 11, 2016

(54) LENS DRIVING DEVICE AND METHOD OF MANUFACTURING THE SAME

(71) Applicant: TDK TAIWAN CORP., Taipei (TW)

(72) Inventors: Chao-Chang Hu, Taipei (TW); Yi-Ho Chen, Taipei (TW)

(73) Assignee: TDK TAIWAN CORP., Taipei (TW)

( * ) Notice: Subject to any disclaimer, the term of this patent is extended or adjusted under 35 U.S.C. 154(b) by 304 days.

(21) Appl. No.: 14/319,192

(22) Filed: Jun. 30, 2014

(65) Prior Publication Data

US 2015/0022891 A1 Jan. 22, 2015

(30) Foreign Application Priority Data

Jul. 22, 2013 (TW) .............................. 102126061 A

(51) Int. Cl.
 *G02B 27/64* (2006.01)
 *G02B 7/08* (2006.01)
(52) U.S. Cl.
 CPC ............... *G02B 27/646* (2013.01); *G02B 7/08* (2013.01); *Y10T 29/49009* (2015.01)
(58) Field of Classification Search
 CPC G03B 13/36; G03B 3/10; G03B 2205/0015; G03B 2202/0069; G03B 5/00; G03B 27/646; G03B 7/02; G03B 2205/0007; G03B 2205/0023; G03B 2205/003; G03B 2205/0038; G03B 2205/0053; G03B 2205/0061; G03B 2205/0069; G03B 2205/0076; G03B 2205/0084; G02B 27/64; G02B 27/646; H04N 5/23248; H04N 5/23264; H04N 5/2328; H04N 5/23283; H04N 5/23287
 USPC ....... 359/824, 554, 813, 814, 555, 556, 557; 396/52, 53, 54, 55, 12, 13; 348/208.99, 348/208.4, 208.5, 208.6, 208.7, 208.8, 348/208.11
 See application file for complete search history.

(56) References Cited

U.S. PATENT DOCUMENTS

| | | | | |
|---|---|---|---|---|
| 7,652,957 B2* | 1/2010 | Tsutsumi | ............. | G02B 27/646 369/44.14 |
| 8,218,957 B2* | 7/2012 | Lee | ....................... | H04N 5/2253 396/55 |
| 9,036,260 B2* | 5/2015 | Sugawara | ................ | G02B 7/08 359/557 |
| 2014/0368915 A1* | 12/2014 | Hu | ....................... | G02B 27/646 359/557 |

* cited by examiner

*Primary Examiner* — Arnel C Lavarias
(74) *Attorney, Agent, or Firm* — Bacon & Thomas, PLLC

(57) ABSTRACT

A lens driving device and a method of manufacturing the device include a driving device having a lens with an optical axis, a focusing coil disposed at a periphery of the lens with respect to the optical axis, a vibration correction coil set comprising a plurality of coils and disposed on a flat surface perpendicular to the optical axis, and a plurality of magnets disposed at the periphery of the lens with respect to the optical axis, with each magnet having a first surface facing the focusing coil and a second surface facing a corresponding one of respective coils of the vibration correction coil set.

8 Claims, 7 Drawing Sheets

LENS DRIVING DEVICE AND METHOD OF MANUFACTURING THE SAME

BACKGROUND OF THE INVENTION

1. Field of the Invention

The present invention relates to a lens driving device, and more particularly, to a lens driving device capable of stabilizing and improving resonances and a method of manufacturing the same.

2. Description of the Prior Art

Those skilled in the art have endeavored to reduce or eliminate the negative impact on photos caused due to the shaking of the camera by the camera operator (the so-called hand shaking) during the photo taking session.

It is commonly agreed that the fast developing optical anti-vibration technique will become the mainstream anti-vibration technique in the future because this technique can prevent drawbacks such as poor image quality as a result of the correction made with software and longer latency of software processing.

In the field of optical anti-vibration, the significant "lens displacement based" optical anti-vibration method has advanced and developed rapidly in recent years. For example, the "common magnet" technique developed in recent years is advantageous in providing an optical anti-vibration function and minimizing the size of the lens driving device. The "common magnet" technique involves employing the same set of magnets to drive two sets of coils so that the lens can move in directions respectively perpendicular and parallel to the optical axis, thereby achieving the auto focusing and anti-vibration functions.

FIG. 1 is a schematic view showing the main structure of a conventional lens displacement based optical anti-vibration device. As shown in FIG. 1, magnets 6 and a coil plate 9 are disposed around a coil 3 and a lens (not shown). The interaction of the magnets 6 and the coil 3 causes the lens to move in an optical axis direction to perform the auto focusing function, and the interaction of the magnets 6 and the coil plate 9 causes the lens to move in a direction perpendicular to the optical axis to perform the optical anti-vibration function. Moreover, the conventional technique shown in FIG. 1 further comprises a displacement sensing device 12 (i.e. a Hall element) mounted on one side of the coil plate 9. No coil is arranged between the displacement sensing device 12 and the magnets 6 so that the displacement sensing device 12 can sense the displacement of the magnets 6 accurately.

According to the structure of the aforementioned conventional device, a coil 92 and a corresponding coil 94 of the coil plate 9 are asymmetric in length, and such asymmetry results in asymmetric forces that cause the occurrence of a yawing resonance in the lens driving device. The yawing resonance generates a force that causes the magnets 6 and the lens to rotate undesirably. For example, the magnets 6 and the lens, which are supposed to rotate solely in the X direction, also move in the Y direction (and vice versa), thus the displacement sensing device 12 will erroneously detect the displacement amount that is not supposed to exist and make an incorrect judgment.

In another aspect, according to the structure of the aforementioned conventional device, the peak of the first-order resonance of the coil plate 9, the magnets 6 and the lens will be significant and cannot be controlled easily, thereby negatively affecting the anti-vibration effect and image quality.

SUMMARY OF THE INVENTION

In view of the aforementioned problems in the conventional technique, an object of the present invention is to provide a lens driving device for stabilizing and improving resonances and a method of manufacturing the same capable of not only suppressing the first-order, the second-order or other resonance peak but also preventing an assembly including the magnets and the lens from rotation with respect to a stationary base so as to allow the displacement sensing device to accurately detect the displacement amount of the magnets. The basic spirit and concept of the present invention involves the addition of an additional coil to the proximity of the coil having a shorter length in the coil plate and an additional magnet above the newly added coil so that the newly added coil can interact with the original magnets to keep the magnitude of the resultant force the same as that of the force in the opposite direction and to prevent an assembly including the magnets and the lens from rotation with respect to a stationary base.

According to the object of the present invention, there is provided a lens driving device, comprising: a lens having an optical axis; a focusing coil disposed at a periphery of the lens with respect to the optical axis; a vibration correction coil set comprising a plurality of coils and disposed on a flat surface perpendicular to the optical axis; and a plurality of magnets disposed at the periphery of the lens with respect to the optical axis, each of which having a first surface facing the focusing coil and a second surface facing a corresponding one of respective coils of the vibration correction coil set; wherein the focusing coil acts on in a direction of the first surface of each of the plurality of magnets to cause an assembly including the lens and the focusing coil to move in the optical axis direction with respect to the plurality of magnets; and wherein a direction in which one coil of the vibration correction coil set acts on the second surface of one of the plurality of magnets is the same as directions in which another two coils of the vibration correction coil set act respectively on the second surfaces of another two magnets of the plurality of magnets so as to cause an assembly including the lens, the focusing coil and the plurality of magnets to move in a direction perpendicular to the optical axis with respect to the vibration correction coil set.

According to the aforementioned object, the lens driving device of the present invention preferably further comprises at least one Hall element disposed between another two coils of the vibration correction coil set and facing the second surfaces in a projection direction parallel to the optical axis without being blocked by the another two coils. The at least one Hall element is configured to detect the directions in which another two magnets of the plurality of magnets move when acted on by another two coils. The lens driving device of the present invention preferably further comprises an upper plate spring and a lower plate spring disposed respectively at the opposite two sides of the plurality of magnets. The lens driving device of the present invention preferably further comprises at least one vibration-absorbing gel disposed in a gap defined by the another two magnets and the lower plate spring, and the at least one vibration-absorbing gel contacts at least partially with the another two magnets and the lower plate spring. The lens driving device of the present invention preferably further comprises at least one suspension wire disposed in a direction parallel to the optical axis and connecting the upper plate spring and the coil plate provided with the vibration correction coil set. Preferably, the at least one suspension wire passes through the gap between the another two magnets.

According to an object of the present invention, there is provided a method of manufacturing a lens driving device comprising the steps of: disposing a focusing coil at a periphery of a lens; disposing a vibration correction coil set comprising a plurality of coils on a flat surface perpendicular to an optical axis of the lens; and disposing a plurality of magnets at the periphery of the lens, each of the plurality of magnets having a first surface caused to face the focusing coil and a second surface configured to face a corresponding one of respective coils of the vibration correction coil set, and characterized in that an assembly including the lens and the focusing coil is caused to move in the optical axis direction with respect to the plurality of magnets in a direction in which the focusing coil acts on the first surface of each of the plurality of magnets, and that an assembly including the lens, the focusing coil and the plurality of magnets is caused to move in a direction perpendicular to the optical axis with respect to the vibration correction coil set where a direction in which one coil of the vibration correction coil set acts on the second surface of one of the plurality of magnets is the same as directions in which another two coils of the vibration correction coil set act respectively on the second surfaces of another two magnets of the plurality of magnets.

According to the aforementioned object, the method of manufacturing a lens driving device of the present invention preferably further comprises the steps of: disposing at least one Hall element between another two coils of the vibration correction coil set and causing the at least one Hall element to face the second surfaces without being blocked by the another two coils, wherein the at least one Hall element is configured to detect a direction in which one of another two magnets of the plurality of magnets moves when acted on by another two coils; disposing an upper plate spring and a lower plate spring in a manner such that they are located respectively at the opposite two sides of the plurality of magnets; disposing at least one suspension wire in a manner such that it connects the upper plate spring and a coil plate provided with the vibration correction coil set and passes through a gap between the another two magnets; and disposing at least one vibration-absorbing gel in a gap defined by the another two magnets and the lower plate spring such that the at least one vibration-absorbing gel contacts at least partially with the another two magnets and the lower plate spring.

The lens driving device and the method of manufacturing the same of the present invention are characterized in that an assembly including the plurality of magnets and the lens can be prevented from a yawing resonance or rotation with respect to a stationary base so that the values read by the Hall element are correct, that the first-order resonance peak can be suppressed, and that the manufacturing yield rate is increased.

DETAILED DESCRIPTION OF THE PREFERRED EMBODIMENTS

The present invention will be more fully described hereinafter with embodiments and the accompanying drawings. Please refer to the drawings for the reference signs used in the description.

Figure 1:
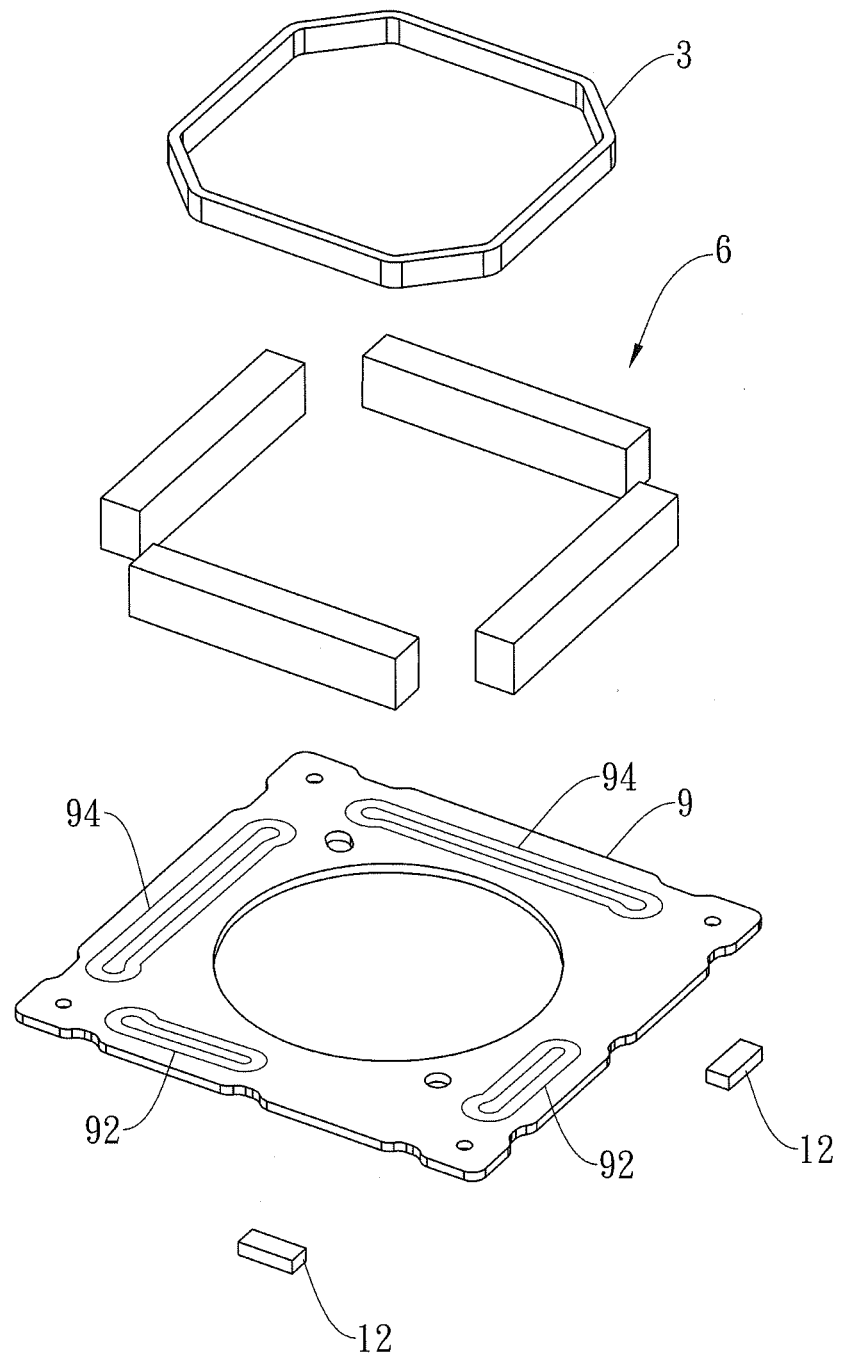
FIG. 1 is a schematic view showing the main structure of a conventional lens displacement based optical anti-vibration device.
Figure 2:
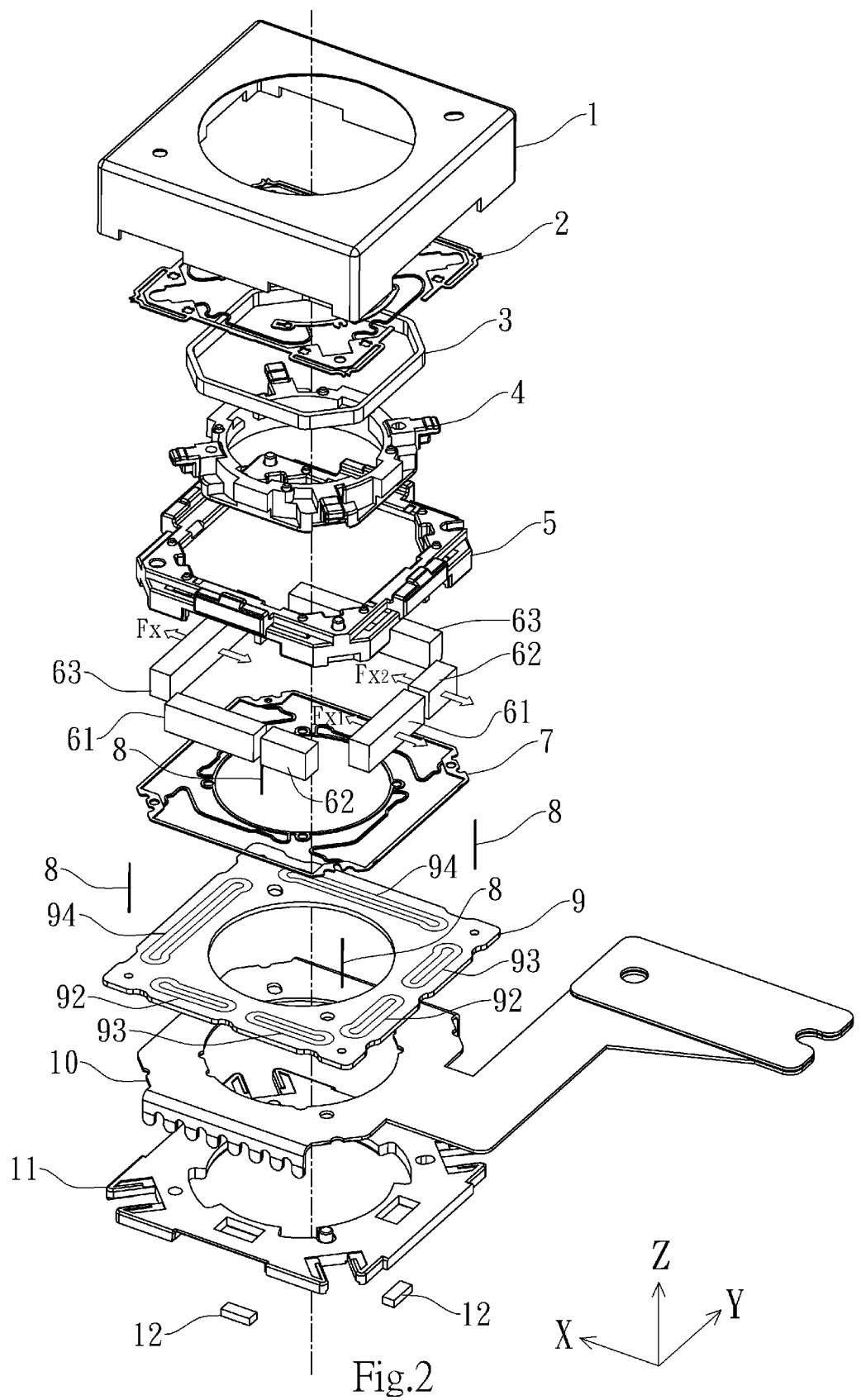
FIG. 2 is an exploded view showing the structure of an embodiment of the present invention.

FIG. 2 is an exploded view showing the structure of an embodiment of the present invention, and the components illustrated therein are to be viewed by reference to the axes X, Y and Z. In this embodiment of the present invention, there is provided a lens driving device comprising, from top to bottom: an outer cover 1; an upper plate spring 2; a focusing coil 3; a lens holder 4; a frame 5; a plurality of magnets disposed at a periphery of the lens holder 4; a lower plate spring 7; a suspension ring wire 8; a coil plate 9 provided with a vibration correction coil set on one flat surface thereof; a flexible circuit board 10; a lower cover 11; and at least one Hall element 12; wherein the vibration correction coil set comprises a first vibration correction coil 92, a second vibration correction coil 93 and a third vibration correction coil 94 arranged respectively in the X axis direction and the Y axis direction; and wherein the plurality of magnets comprise a first magnet 61, a second magnet 62, and a third magnet 63 arranged respectively in the X axis direction and the Y axis direction. The embodiments of the present invention will be described with exemplary vibration correction coils 92, 93 and 94 of the vibration correction coil set arranged in the X axis direction and the corresponding magnets 61, 62 and 63 of the plurality of magnets. A person having ordinary knowledge in the art understands that the anti-vibration effect achieved in the X axis direction can be achieved in the Y axis as well. While the lens driving device of this embodiment comprises the aforementioned components in a sequential order, a person having ordinary knowledge in the art understands that the order of the aforementioned components can be adjusted or a plurality of components can be combined to perform the same function as the lens driving device of the present invention without departing from the spirit and scope of the present invention. Therefore, the order and number of the aforementioned components are exemplary and are not intended to limit the present invention.

The outer cover 1 is arranged at the outermost of the lens driving device to protect the device against external influences, such as dust. The lens holder 4 is configured to carry a lens (not shown), and the frame 5 is configured to secure the lens holder 4 and the lens. The focusing coil 3 winds around the lens holder 4 and the lens, and a plurality of magnets are arranged and received under the frame 5. The plurality of magnets comprise a first magnet 61, a second magnet 62, and a third magnet 63 arranged respectively in the X axis direction and the Y axis direction and are disposed at a periphery of the lens. Each of the first magnet 61, the second magnet 62, and the third magnet 63 has a first surface facing the focusing coil 3 and a second surface facing a corresponding one of respective coils 91, 92 and 93 in the coil plate 9 (in this embodiment, in the X axis direction, the second surface of the first magnet 61 faces the first vibration correction coil 92, the second surface of the second magnet 62 faces the second vibration correction coil 93, and the second surface of the third magnet 63 faces the third vibration correction coil 94). In the X axis direction, a magnet 63 and another two magnets 61 and 62 are arranged at the opposite sides of the periphery of the lens holder 4 (or the lens). When received in the frame 5, the another two magnets 61 and 62 are separated by a side wall of the frame 5 (please refer to FIG. 3), thus the combined length of the another two magnets 61 and 62 is slightly shorter than the length of the third magnet 63 and the height of the side wall of the frame 5 is slightly smaller than the thickness of each of the another two magnets 61 and 62. An assembly including the focusing coil 3, the lens holder 4, the frame 5 and the plurality of magnets is sandwiched in between the upper plate spring 2 and the lower plate spring 7 arranged at the upper side and the lower side respectively, and an electromagnetic induction force between the plurality of magnets and the focusing coil 3 causes an assembly including the focusing coil 3, the lens holder 4 and the lens to move in an optical axis direction with respect to the plurality of magnets, thereby achieving the auto focusing function. The electromagnetic induction force between the plurality of magnets and the focusing coil 3 is generated when the focusing coil 3 acts on the first surface of each of the first magnet 61, the second magnet 62 and the third magnet 63.

The coil plate 9 is disposed under the lower plate spring 7 and connects the upper plate spring 2 with four suspension wires 8 located at the four corners thereof. A vibration correction coil set comprising a first vibration correction coil 92, a second vibration correction coil 93, and a third vibration correction coil 94 is disposed on one flat surface of the coil plate 9 which is perpendicular to the optical axis. The suspension wires 8 can not only be used to secure and stabilize the lens driving device but also be optionally made of a metal material (conductive) so that a current can be supplied to the focusing coil 3 from the flexible circuit board 10 through the suspension wires.

The flexible circuit board 10, the lower cover 11 and the Hall element 12 are sequentially arranged under the coil plate 9. The lens driving device of the present invention is electrically connected to other external devices via the flexible circuit board 10 so that it can be controlled and communicate signals externally. While the aforementioned lens driving device of the present invention is electrically connected to external devices via the flexible circuit board 10, a person having ordinary knowledge in the art understands that circuit boards made of any other materials can substitute for the flexible circuit board 10 without departing from the spirit and scope of the present invention. The lower cover 11 has two holes for mounting and securing therein the Hall elements 12 and is configured to join and secure the components disposed thereabove.

The electromagnetic field effect between the plurality of magnets and the vibration correction coil set of the coil plate 9 causes an assembly including the lens, the upper plate spring 2, the focusing coil 3, the lens holder 4, the frame 5, the plurality of magnets and the lower plate spring 7 to move in a direction perpendicular to the optical axis with respect to the vibration correction coil set or the coil plate 9, thereby achieving the optical anti-vibration function. In the embodiment of the present invention, the movement of the aforementioned assembly in a direction perpendicular to the optical axis with respect to the vibration correction coil set or the coil plate 9 is caused by the electromagnetic field forces Fx, Fx1 and Fx2 between the plurality of magnets and the vibration correction coil set of the coil plate 9, specifically, the forces Fx1 and Fx2 from the first vibration correction coil 92 and the second vibration correction coil 93 acting respectively on the second surfaces of the first magnet 61 and the second magnet 62 and the force Fx from the third vibration correction coil 94 acting on the second surface of the third magnet 63. As a magnet 63 and another two magnets 61 and 62 are arranged respectively at the opposite sides of the lens holder 4 (or the lens), the direction in which the resultant force of two forces (Fx1+Fx2) acts on the first magnet 61 and the second magnet 62 is substantially the same as the direction in which the force Fx from the third vibration correction coil 94 acts on the third magnet 63. Therefore, in the embodiment of the present invention, the assembly including the lens, the upper plate spring 2, the focusing coil 3, the lens holder 4, the frame 5, the plurality of magnets and the lower plate spring 7 will not rotate with respect to the components disposed thereunder.

In the embodiment of the present invention, the Hall element 12 serves as a displacement sensing device for detecting the displacement of a portion of the magnets 61 among the plurality of magnets. Referring to FIG. 2, a Hall element 12 is arranged in the X axis direction to detect a displacement amount in the Y axis direction of an assembly including the lens, the upper plate spring 2, the focusing coil 3, the lens holder 4, the frame 5, the plurality of magnets and the lower plate spring 7, and another Hall element 12 is arranged in the Y axis direction to detect a displacement amount in the X axis direction of the assembly. After detecting the displacement amount of a portion of the magnets 61 among the plurality of magnets, the Hall elements 12 transmit the detected information outward to an external device via the flexible circuit board 10 so that the external device can learn the magnitude of the vibration affecting the lens during the photo taking session and perform the anti-vibration control. The Hall element 12 of the present invention is provided under the coil plate 9 and positioned between the first vibration correction coil 92 and the second vibration correction coil 93 (when viewed in the X and Y directions), that is, the Hall element 12 faces the second surface of the magnet 61 in a projection direction parallel to the optical axis without being blocked by another two coils 92, 93, thus the electromagnetic field effect from another two coils 92 and 93 that affects the detection of the displacement amount of the magnet 61 will be minimized. Therefore, the Hall element 12 can precisely detect the displacement of the magnet 61 in the embodiment of the present invention.

It is to be noted that the length of the first vibration correction coil 92 is not necessarily the same as that of the second vibration correction coil 93. A person having ordinary knowledge in the art understands that even if the first vibration correction coil 92 and the second vibration correction coil 93 are different in length, the direction in which the resultant force of two forces from the first vibration correction coil 92 and the second vibration correction coil 93 acts on another two magnets 61 and 62 can be substantially the same as the direction in which the force from the third vibration correction coil 94 acts on a third magnet 63 by adjusting the magnitude of the current or the number of turns of the coil.

Figure 3:
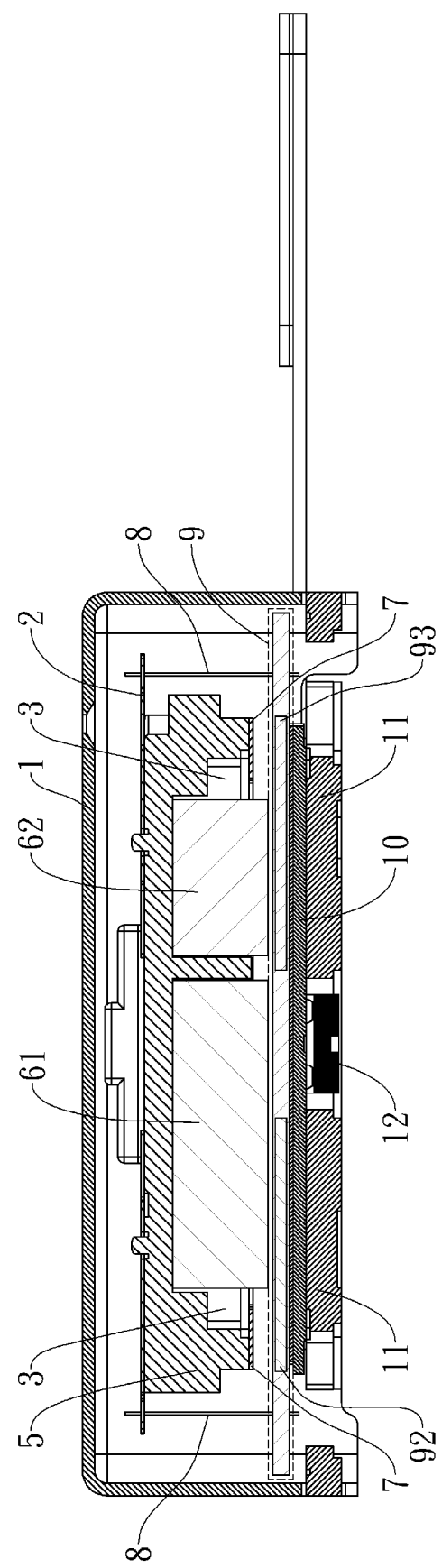
FIG. 3 is a section view of an embodiment of the present invention.

FIG. 3 is a section view of an embodiment of the present invention. As shown in FIG. 3, the assembled lens driving device of the present invention is divided into a movable portion (an assembly consisting of the lens, the upper plate spring 2, the focusing coil 3, the lens holder 4, the frame 5, the plurality of magnets and the lower plate spring 7) and a stationary portion (an assembly consisting of the outer cover 1, the coil plate 9, the flexible circuit board 10, the lower cover 11 and the Hall element 12). The movable portion and the stationary portion are connected via the suspension wires 8, that is, the suspension wires 8 connect the upper plate spring 2 and the coil plate 9 in a direction parallel to the optical axis. The electromagnetic induction between the first and second vibration correction coils 92 and 93 and the first and second magnets 61 and 62 causes the movable portion to move in a direction perpendicular to the optical axis, thereby achieving the optical anti-vibration function of the present invention. Moreover, as the direction in which the resultant force of two forces (Fx1+Fx2) acts on the first magnet 61 and the second magnet 62 is the same as the direction in which the force Fx acts on the opposite third magnet 63, the movable portion will not rotate and thereby to prevent the Hall element 12 from reading the data inaccurately.

Figure 4:
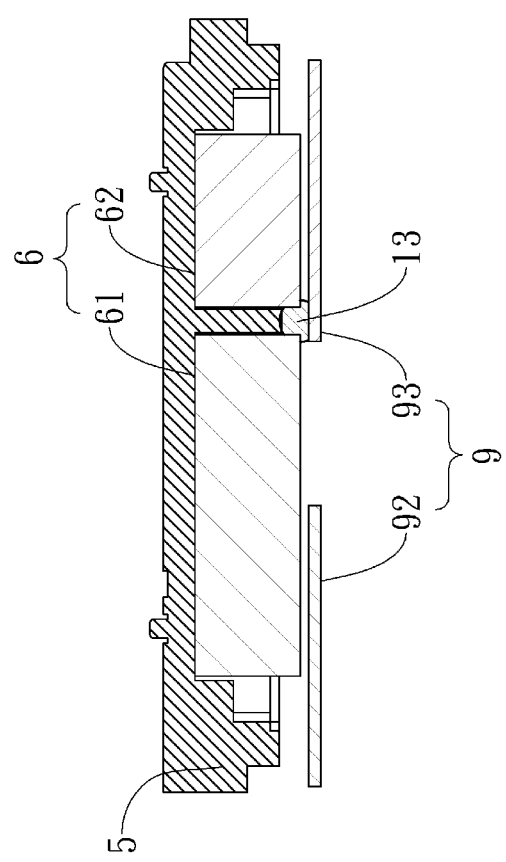
FIG. 4 is a schematic view showing the main components in an embodiment of the present invention.

FIG. 4 is a schematic view showing the main components in an embodiment of the present invention. As shown in FIG. 4, a vibration-absorbing gel 13 is disposed between the first magnet 61, the second magnet 62 and the coil plate 9. The vibration-absorbing gel 13 is configured to suppress the first-order resonance peak and thereby to minimize the negative impact of the first-order resonance on image formation. As the first magnet 61 and the second magnet 62 are separated by a side wall of the frame 5 when received in the frame 5 and the side wall has a height slightly smaller than the thickness of each of the magnets 61 and 62, the magnets 61 and 62 and the side wall of the frame 5 define a step-shaped notch (which can also be seen in FIG. 3) which can restrict the position of the vibration-absorbing gel 13 so that the vibration-absorbing gel 13 will not deviate from the original position when the movable portion moves to the left or right to perform the optical anti-vibration function. Consequently, the vibration-absorbing gel 13 can be prevented from being squeezed to the outside of the magnets or the coil plate 9 to lose its vibration-absorbing function.

Figure 5:
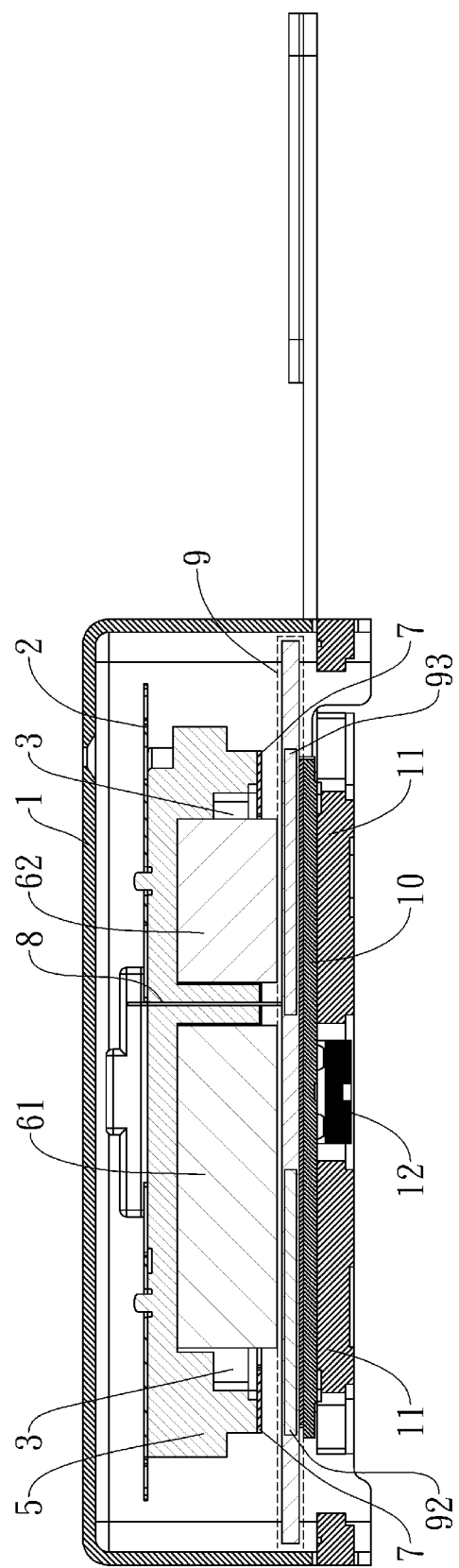
FIG. 5 is a section view of another embodiment of the present invention.

FIG. 5 is a section view of another embodiment of the present invention. In the arrangement in FIG. 5, unlike those arranged at the corners of the coil plate 9 as shown in FIGS. 2 and 3, the suspension wire 8 passes through a gap between the first magnet 61 and the second magnet 62. Such an arrangement can improve the problem that the suspension wires 8 cannot be easily placed at the four corners of the coil plate 9 or the upper plate spring 2 during the manufacturing process (generally, there is left almost no space in the four corners of the coil plate 9 or the upper plate spring 2 for the suspension wires 8 during the manufacturing process so that the size of the device can be reduced). Therefore, the manufacturing yield rate of the lens driving device of the present invention can be further increased. In the embodiment shown in FIG. 5, unlike the arrangement of a magnet and another two magnets at the opposite sides of the periphery of the lens holder 4 (or the lens) as shown in FIG. 2, two pairs of magnets are arranged respectively at the opposite sides of the periphery of the lens holder 4 (or the lens) to facilitate the suspension wire 8 to pass through the gap between each of the two pairs of magnets so that the suspension wires 8 can be symmetrically arranged around the optical axis; meanwhile, the coils on the coil plate 9 are arranged in a manner such that two pairs of coils correspond to the second surfaces of the two pairs of magnets, respectively. The rest of the components in this embodiment are the same as those in the embodiments shown in FIGS. 2 and 3, thus no further description will be provided.

Figure 6:
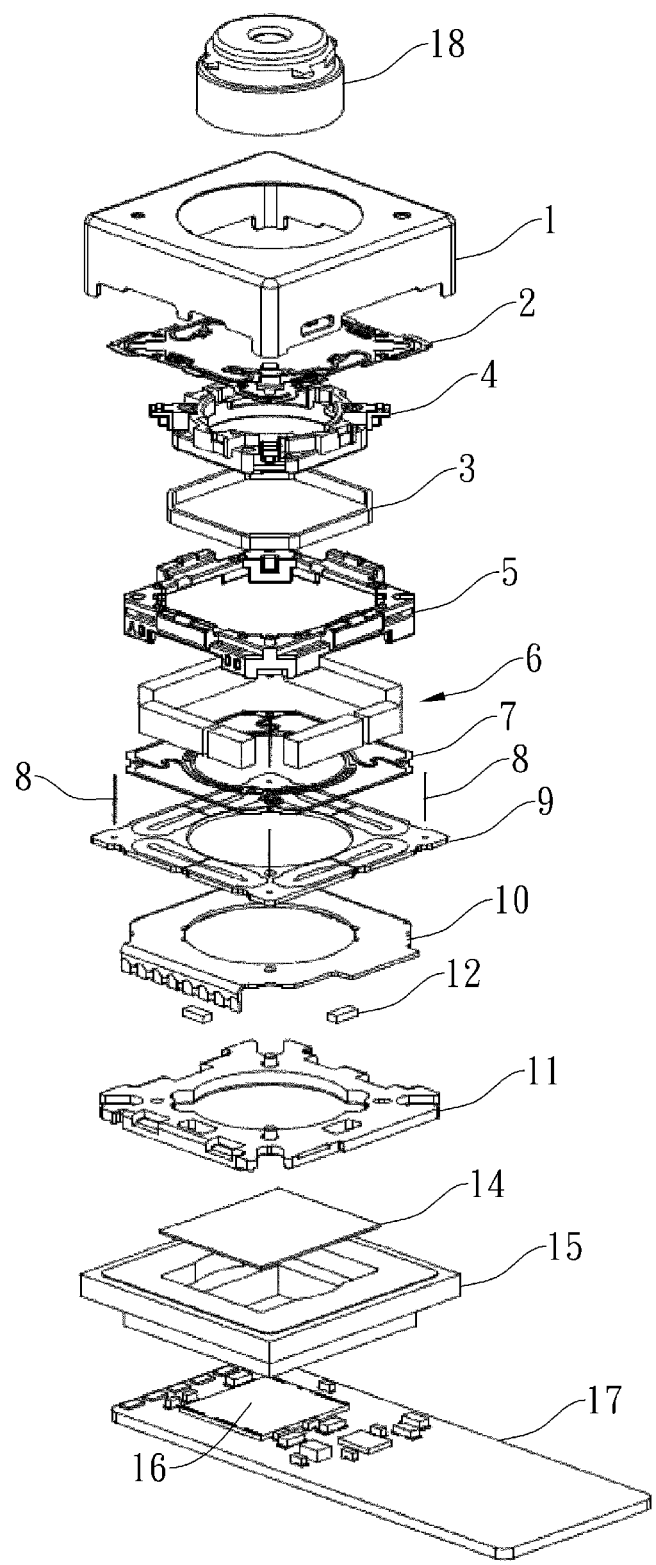
FIG. 6 is an exploded view showing a complete set of the present invention.

FIG. 6 is an exploded view showing a complete set of the present invention. As shown in FIG. 6, the lens driving device of the present invention further comprises an IR filter lens 14, a sensor holder 15, an image sensor 16, a sensor substrate 17 and a lens 18. The IR filter lens 14 filters out infrared rays to reserve colors visible to naked eyes (i.e. visible lights) so that the Charge Coupled Device (CCD)/ Complementary Metal-Oxide Semiconductor (CMOS) in the image sensor 16 is sensitive to visible lights only, thereby producing correct images. The sensor holder 15 is used to secure the image sensor 16 so that the light entering the lens 18 can be sensed accurately. The image sensor 16 is mounted on the sensor substrate 17 so that the sensed image can be transmitted to the rest parts of the camera in the form of signals.

Figure 7:
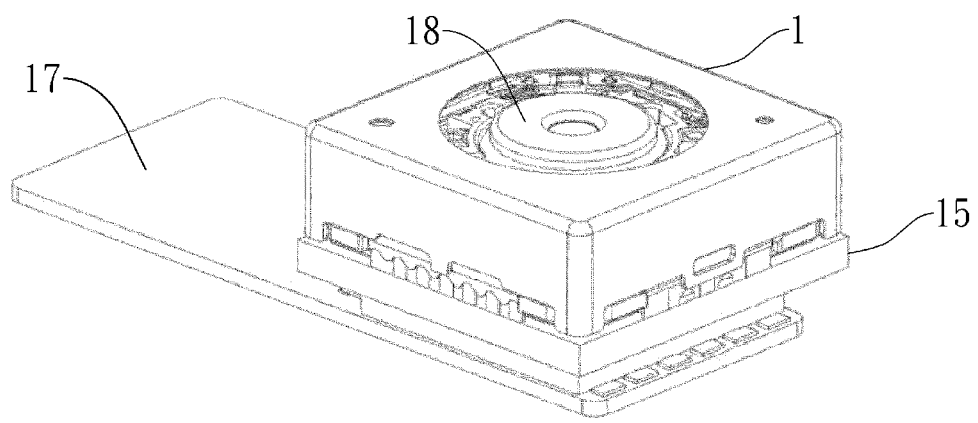
FIG. 7 is a schematic view showing the assembly of the complete set of the present invention.

FIG. 7 is a schematic view showing the assembly of a complete set of the present invention. As shown in FIG. 7, the size of the assembled lens driving device of the present invention is relatively small. If the present invention is applied to a portable handheld device, such as a mobile phone, the hand-held device will be characterized by not only a significantly reduced size capable of being easily carried about but also the anti-vibration function.

To sum up, the lens driving device and the method of manufacturing the same of the present invention can solve the problem that the forces applied by coils are asymmetric in the prior art invention so that the assembly including the magnets and the lens can be prevented from the yawing resonance or rotation with respect to the stationary base, and is advantageous in that the first-order, second-order or other resonance peak can be suppressed simultaneously and that the manufacturing yield rate is increased.

The embodiments described above are exemplary and are not intended to limit the present invention. Any modification or alteration with the same effect made to the present invention without departing from the spirit and scope of the present invention shall fall within the scope of the appended claims.

What is claimed is:

1. A lens driving device, comprising:
   a lens having an optical axis;
   a focusing coil disposed at a periphery of the lens with respect to the optical axis;
   a vibration correction coil set comprising a plurality of coils and disposed on a flat surface perpendicular to the optical axis; and
   a plurality of magnets disposed at the periphery of the lens with respect to the optical axis, each of which having a first surface facing the focusing coil and a second surface facing a corresponding one of respective coils of the vibration correction coil set;
   wherein the focusing coil acts on the first surface of each of the plurality of magnets to cause a first assembly including the lens and the focusing coil to move in the optical axis direction with respect to the plurality of magnets;
   and wherein a direction in which one coil of the vibration correction coil set acts on the second surface of one of the plurality of magnets is the same as directions in which another two coils of the vibration correction coil set act respectively on the second surfaces of another two magnets of the plurality of magnets so as to cause a second assembly including the lens, the focusing coil and the plurality of magnets to move in a direction perpendicular to the optical axis with respect to the vibration correction coil set.

2. The lens driving device according to claim 1 further comprising at least one Hall element disposed between the another two coils of the vibration correction coil set and facing the second surfaces in a projection direction parallel to the optical axis without being blocked by the another two coils.

3. The lens driving device according to claim 1, wherein a vibration-absorbing gel is disposed in a gap defined by the another two magnets and a coil plate provided with the vibration correction coil set, and the vibration-absorbing gel contacts at least partially with the another two magnets and the coil plate.

4. The lens driving device according to claim 1 further comprising a frame receiving a plurality of magnets, wherein the frame has a side wall between the another two magnets and the side wall has a height slightly smaller than a thickness of each of the another two magnets.

5. A method of manufacturing a lens driving device mounted on an image sensor and a sensor substrate, comprising the steps of:
   disposing a focusing coil at a periphery of a lens;
   disposing a vibration correction coil set comprising a plurality of coils on a flat surface perpendicular to an optical axis of the lens; and
   disposing a plurality of magnets at the periphery of the lens, wherein each of the plurality of magnets has a first surface configured to face the focusing coil and a second surface configured to face a corresponding one of respective coils of the vibration correction coil set, and characterized in that:
   the focusing coil acts on the first surface of each of the plurality of magnets to cause a first assembly including the lens and the focusing coil to move in the optical axis direction with respect to the plurality of magnets; and that
   a direction in which one coil of the vibration correction coil set acts on the second surface of one of the plurality of magnets is the same as directions in which another two coils of the vibration correction coil set act respectively on the second surfaces of another two magnets of the plurality of magnets so as to cause a second assembly including the lens, the focusing coil and the plurality of magnets to move in a direction perpendicular to the optical axis with respect to the vibration correction coil set.

6. The method of manufacturing a lens driving device according to claim 5 further comprising the step of:
   disposing at least one Hall element between the another two coils of the vibration correction coil set and causing the at least one Hall element to face the second surfaces in a projection direction parallel to the optical axis without being blocked by the another two coils.

7. The method of manufacturing a lens driving device according to claim 5 further comprising the step of: disposing at least one vibration-absorbing gel in a gap defined by the another two magnets and a coil plate provided with the vibration correction coil set so that the at least one vibration-absorbing gel contacts at least partially with the another two magnets and the coil plate.

8. The method of manufacturing a lens driving device according to claim 5 further comprising the step of:
   disposing a frame receiving the plurality of magnets, wherein the frame has a side wall between the another two magnets and the side wall has a height slightly smaller than a thickness of each of the another two magnets.

* * * * *